UNITED STATES PATENT OFFICE.

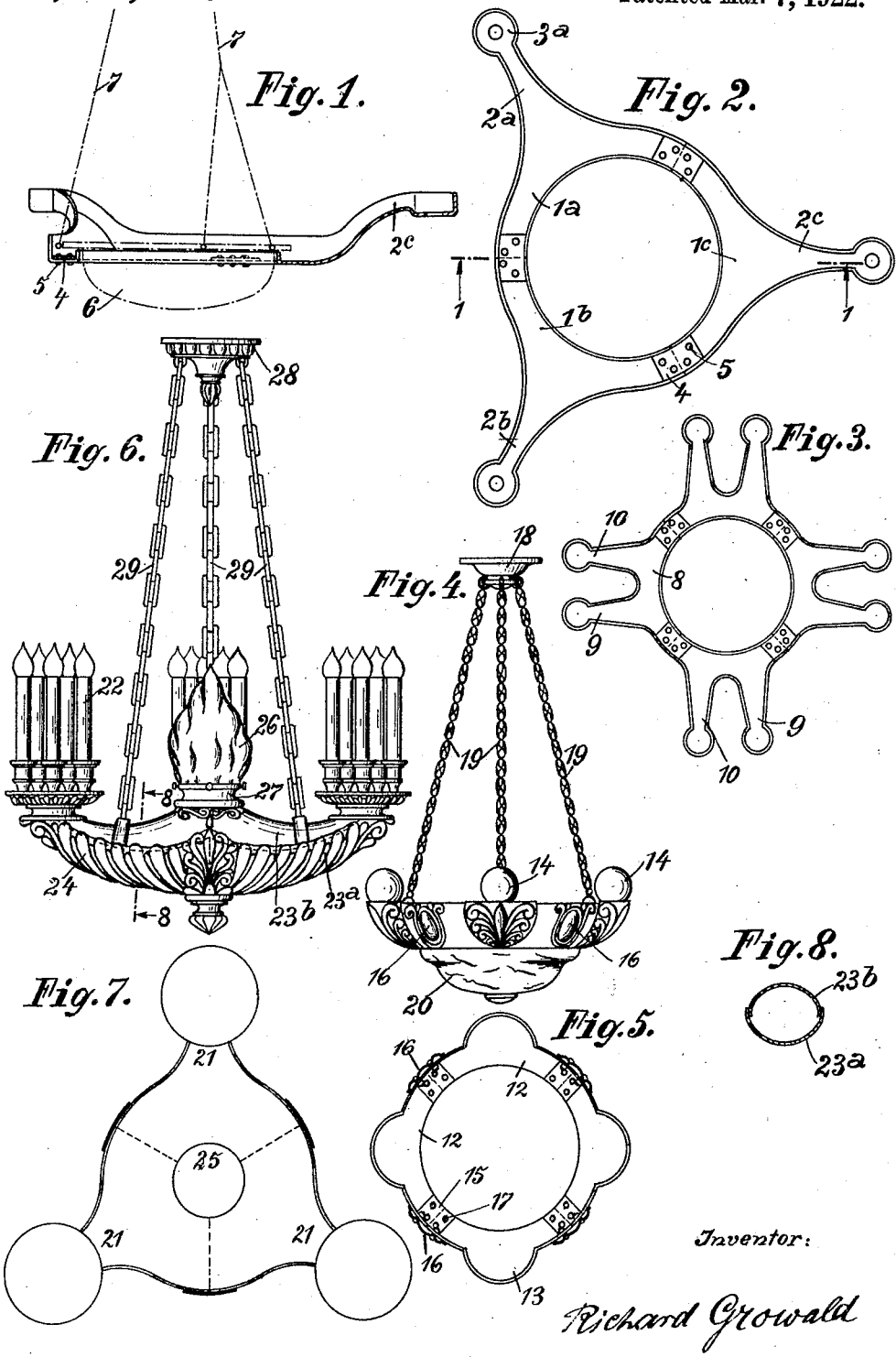

RICHARD GROWALD, OF BERLIN, GERMANY.

CHANDELIER.

1,408,588.  Specification of Letters Patent.  Patented Mar. 7, 1922.

Application filed June 10, 1919. Serial No. 303,262.

(GRANTED UNDER THE PROVISIONS OF THE ACT OF MARCH 3, 1921, 41 STAT. L., 1313.)

*To all whom it may concern:*

Be it known that I, RICHARD GROWALD, a citizen of the German Republic, residing at Berlin, Germany, have invented a new and useful Improvement in a Chandelier, (for which I have filed applications in Germany on Sept. 3, 1917,) of which the following is a specification.

My invention relates to chandeliers and the like lights carrying structures. It is the object of my invention to provide a chandelier which is composed of a plurality of uniform sections each of which being adapted to carry one or a plurality of lights. These uniform sections are interconnected by means of connecting plates and screws or rivets or by soldering or welding, whereafter the article is ready for use and does not require any finishing treatment or the like. I prefer to produce the uniform sections by a pressing action from sheet metal whereby I obtain an article which is of smaller weight and, hence, cheaper to produce than can be made by any other mode of working.

Owing to my present invention I am able to materially reduce the expenses for wages since the work of assembling the thus produced sectional parts may be carried out by ordinary workmen instead of by skilled girdlers. A further advantage secured by my present invention is that the sections may be shipped and delivered unconnected and the work of assembling said sections be done at the local selling places, whereby expenses for packing materials and freight charges are materially reduced.

Although my novel chandeliers may be produced cheaply and on a manufacturing scale, yet these chandeliers can be given any ornamental effects to satisfy the most exacting taste.

In order to render my invention quite clear I have illustrated some embodiments of the same by way of example in the accompanying drawings in which Fig. 1 shows in a sectional view along the line 1—1 of Fig. 2 a chandelier having three arms on which to carry lights.

Fig. 2 is a plan view of Fig. 1.

Fig. 3 shows, in a plan view, a chandelier constructed on the same principle as the chandelier illustrated in Fig. 2 but having two lights carrying arms on each section of which four are employed to compose the chandelier.

In Figs. 4 and 5 I have illustrated, in elevation and plan view respectively, a modification in which the lights are carried on part-globular projections.

Fig. 6 illustrates another embodiment of my invention in which each section is composed of more than one pressed part.

Fig. 7 is a diagrammatical plan view of Fig. 6.

Fig. 8 shows, diagrammatically a cross-section along the line 8—8 in Fig. 6.

Referring to Figs. 1 and 2, the chandelier is composed of sections $1^a$, $1^b$, and $1^c$, which are of uniform shape and size and may be produced with one and the same set of pressing tools. Each section is provided with an arm such as $2^a$, $2^b$, and $2^c$ which terminates in a cup-like structure 3 adapted in well known manner to carry an electric or a gas light or the like.

The sections are interconnected by means of uniform connecting plates 4 and rivets or screw bolts 5. The sections may also be interconnected by soldering or welding or any other approved means. As I have indicated in Fig. 1 by means of dash-and-dot lines, the chandelier may be adapted to receive a center bowl 6 preferably of glass, and may be suspended on chains 7 or the like suspension members. The chandelier may be of any sectional form; instead of making it angular as shown in Figs. 1, 2, and 3, I may give it a semi-circular or full circular sectional form as shown in Figs. 4 and 5, and 6, 7, and 8, respectively. The chandelier shown in Fig. 3 is composed of four uniform sections 8 each of which is provided with two arms 9 and 10 adapted to carry lights of any character and ornamental effect.

In Figs. 4 and 5 I have shown, in elevation and diagrammatical plan view, a chandelier composed of four uniform sections 12 of a curved form in cross section and having part globular projections 13 adapted to carry lights 14 of any desired character and ornamental effect. The sections are interconnected by means of internal connecting plates 15 and external connecting plates 16 and rivets or screws 17. The external connecting plates 16 are preferably formed as ornaments, their office being to cover externally the line of joint between two interconnected sections. The main structure of the chandelier, as produced according to my present invention, may be suspended from a ceiling piece 18, by means of chains or the like suspension members 19 and may be provided with a center bowl 20 of any desired form and material.

In Figs. 6, 7, and 8 I have illustrated a chandelier made according to my present invention and which is composed of three sections each carrying, on one arm 21, five lights 22 of a candle-like form. Each section is composed of two concavely pressed parts 23ª and 23ᵇ as shown in the diagrammatical section of Fig. 8. I prefer to make the bottom part 23ª somewhat larger so that the same overlaps the covering part 23ᵇ (see Fig. 8). The bottom part 23ª of each section is preferably provided with ornamental embossments 24 the upper terminations of which overlap the line of juncture between the parts 23ª and 23ᵇ. The center opening 25 (see Fig. 7) may be crowned by a glass torch 26 as shown in Fig. 6 which torch is shown to be mounted on an angular body 27. The chandelier may be suspended from a ceiling piece 28 by means of chains 29 or the like suspension members.

What I claim as my invention, and desire to secure by Letters Patent of the United States, is:

1. A chandelier, comprising, in combination, a plurality of uniform and hollow pressed sheet metal sections, means for interconnecting said sections, and a projection on each of said sections and adapted to carry lights.

2. A chandelier, comprising, in combination, a plurality of uniform and hollow pressed sheet metal sections, means for interconnecting said sections, and on each of said sections a projecting part integral with said respective section and adapted to carry lights.

3. A chandelier, comprising, in combination, a plurality of uniform and hollow pressed sheet metal sections, each of said sections being composed of a plurality of supplementary parts, and means for interconnecting said sections, each of said sections being adapted to carry lights.

RICHARD GROWALD.